No. 747,645. PATENTED DEC. 22, 1903.
O. SACHSE.
APPARATUS FOR EVAPORATING BRINE.
APPLICATION FILED JAN. 2, 1903.
NO MODEL. 3 SHEETS—SHEET 1.

No. 747,645. PATENTED DEC. 22, 1903.
O. SACHSE.
APPARATUS FOR EVAPORATING BRINE.
APPLICATION FILED JAN. 2, 1903.
NO MODEL. 3 SHEETS—SHEET 2.

Witnesses
Inventor
Otto Sachse

No. 747,645. PATENTED DEC. 22, 1903.
O. SACHSE.
APPARATUS FOR EVAPORATING BRINE.
APPLICATION FILED JAN. 2, 1903.
NO MODEL. 3 SHEETS—SHEET 3.
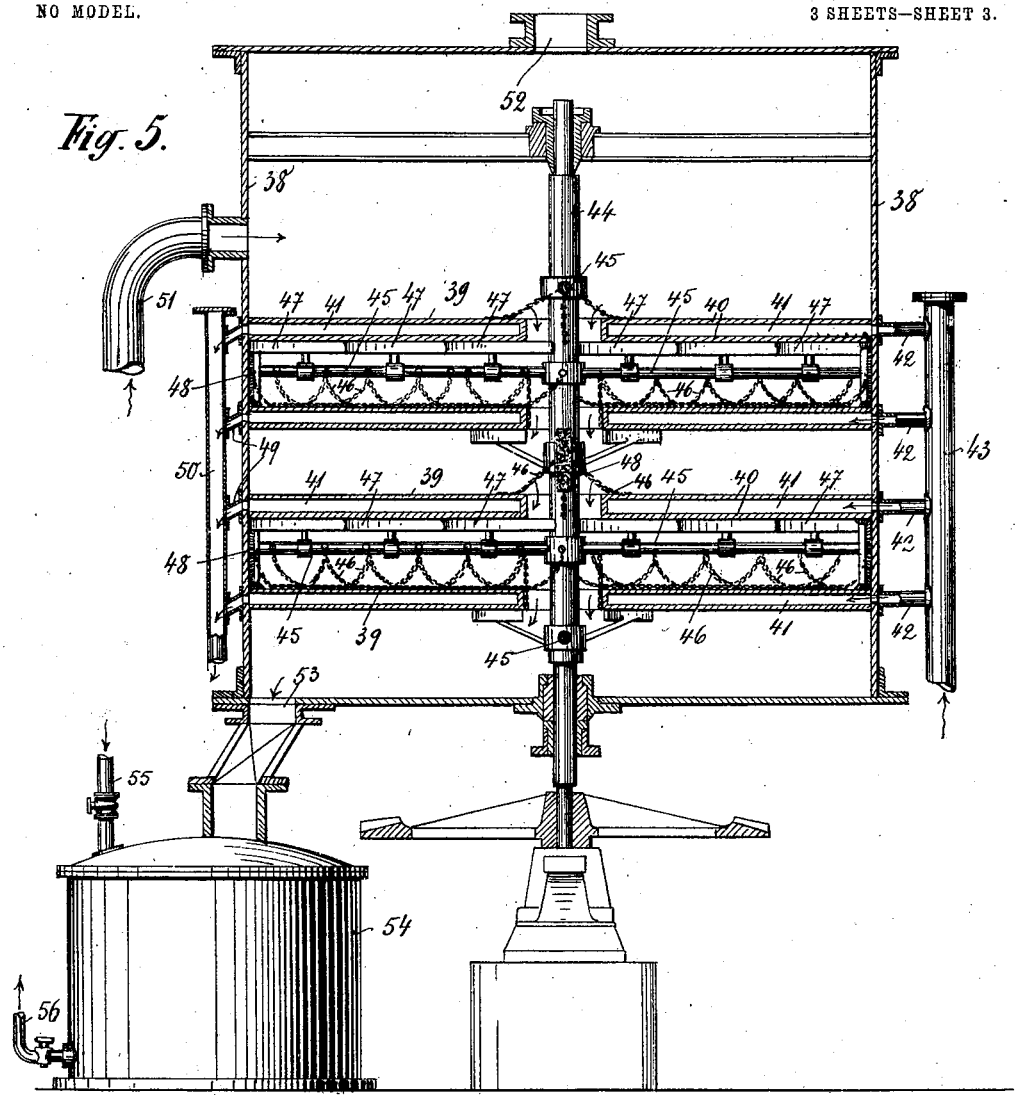
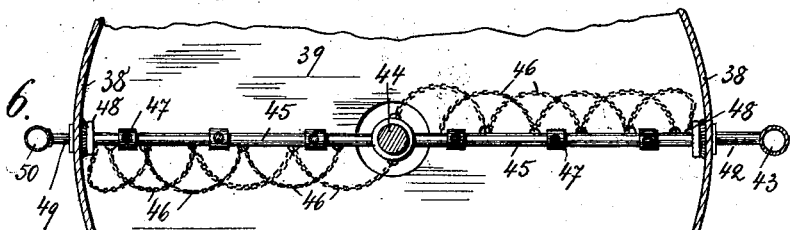

No. 747,645. Patented December 22, 1903.

UNITED STATES PATENT OFFICE.

OTTO SACHSE, OF LUNEBURG, GERMANY.

APPARATUS FOR EVAPORATING BRINE.

SPECIFICATION forming part of Letters Patent No. 747,645, dated December 22, 1903.

Application filed January 2, 1903. Serial No. 137,515. (No model.)

*To all whom it may concern:*

Be it known that I, OTTO SACHSE, a subject of the German Emperor, residing at Luneburg, in the German Empire, have invented certain new and useful Improvements in Apparatus for the Evaporation of Brine, of which the following is a specification.

The present invention relates to apparatus for evaporating brine, and has for its object the evaporation of brine in a more expeditious and considerably cheaper manner than heretofore.

The object of this invention is to render a continuous evaporation of brine possible by keeping the walls of the evaporating apparatus permanently free from pan-scales. I attain this by constantly scraping or scrubbing during the evaporation all surfaces in contact with the brine with stirring devices.

For evaporating brine free from gypsum it suffices to rub the walls of the apparatus with chains, brushes, or other less intensively acting stirring devices. If, however, I want to evaporate brine containing gypsum, I require stirring devices provided with cutting edges directed obliquely against the walls of the apparatus, so as to scrape off the pan-scales from the walls as soon as formed before they have time to settle.

In my apparatus I preferably employ a number of superimposed trays heated by steam and surrounded by a cylindrical mantle.

In order that my invention may be clearly understood, I show two differently-constructed evaporating apparatus on the accompanying drawings, by the aid of which I will now explain my invention.

Figure 1:
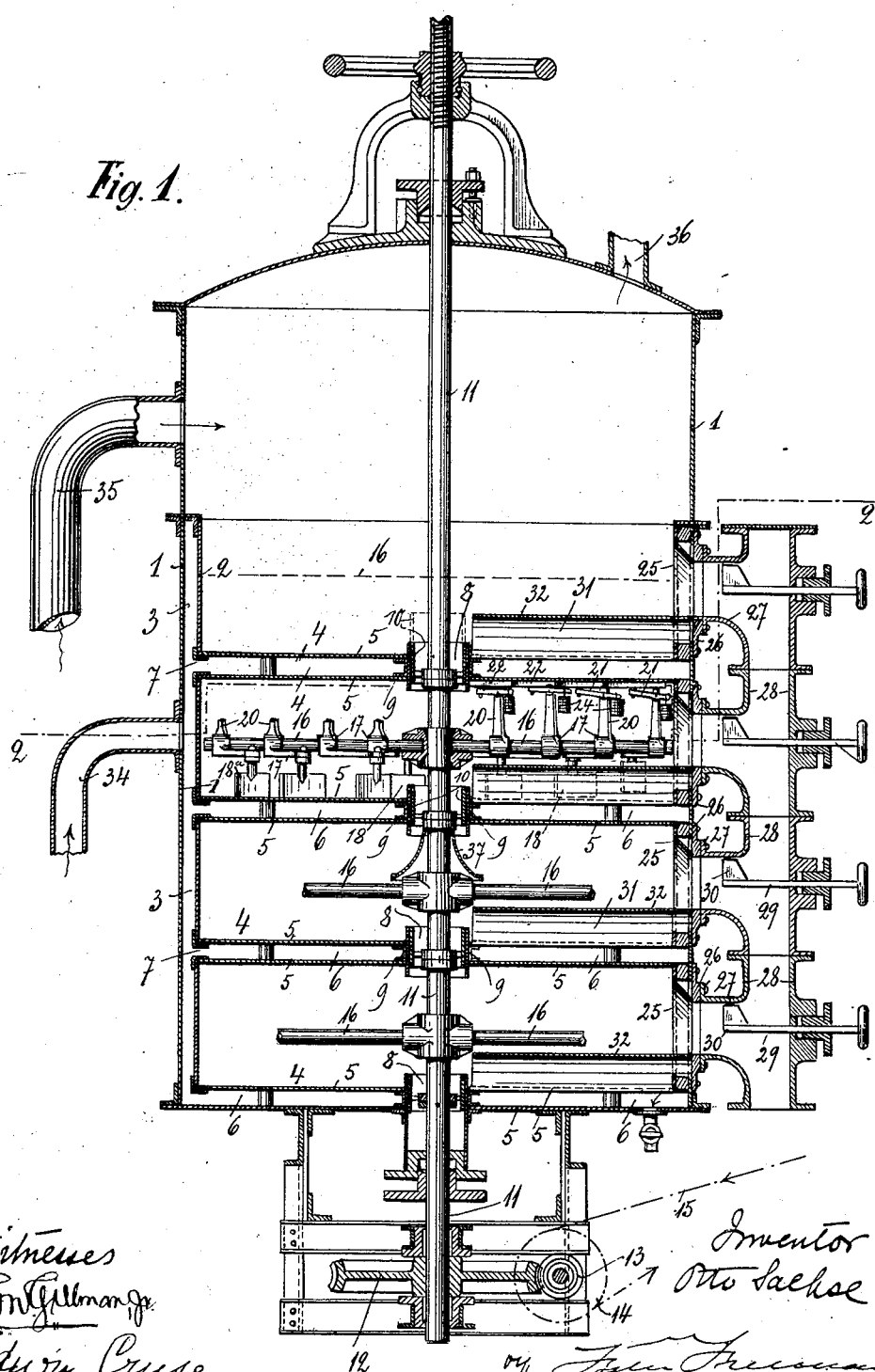
Figure 2:
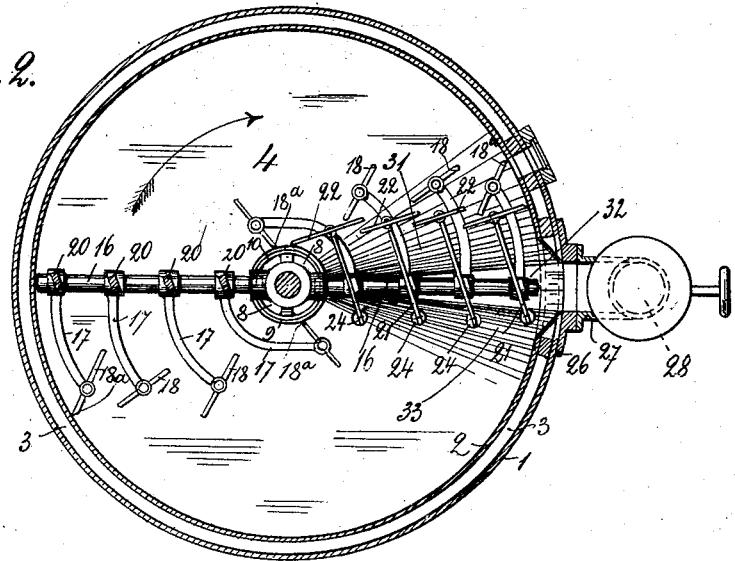
Figure 3:
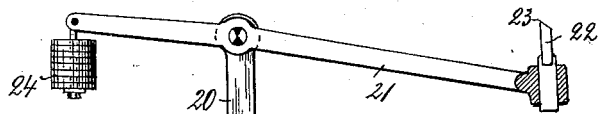
Figure 4:
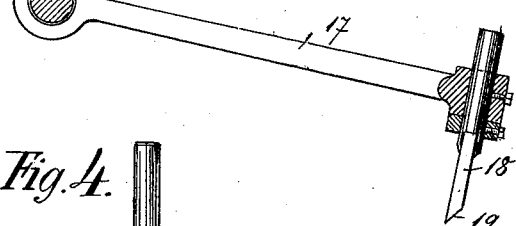

Figure 1 of the drawings shows a vertical section through an evaporating apparatus constructed in accordance with my present invention. Fig. 2 is a horizontal section on the line 2 2 of Fig. 1. Fig. 3 shows the arrangement of the stirring devices with cutting edges. Fig. 4 shows a front view of the stirring device shown in Fig. 3 in cross-section. Figs. 5 and 6 show another form of an evaporating apparatus in a vertical section through the middle and a horizontal section.

Similar numbers refer to similar parts throughout the several views.

Of the apparatus shown in Figs. 1 to 4, 1 designates the outer mantle. 2 is an inner mantle, between which and the outer mantle there is an annular hollow space or jacket 3. To the inner mantle 2 are affixed the superposed trays or plates 4. These have a double bottom 5. The bottoms 5 leave between themselves and the trays 4 hollow spaces 6, free to communicate with the annular hollow space 3 through openings 7. The trays 4 are annular and leave in the center circular spaces 8, which are surrounded by the cylinders 9. Inside of the cylinders 9 are provided sliding cylinders 10, the object of which is to regulate the height of the rims or side walls of the trays. The sliding cylinders 10 may, however, be dispensed with. Through the openings 8 of plates 4 passes a shaft 11, which can be suitably rotated by a worm-wheel 12, a worm 13, a pulley 14, and a belt 15, by any motive power. The shaft 11 carries arms 16, suitably connected to it. On the arms 16 are arranged rotating arms 17, provided at their outer ends with stirring devices 18. The stirring devices 18 have at their lower ends cutting-surfaces 19, with which they rest on the trays or plates 4. The arms 17 are connected to arms 20, on which are pivotally fixed the levers 21, which at one of their ends carry scrapers 22, which are the same as the stirring devices 18, provided with cutting edges 23, and are adapted to bear against the under side of the bottoms 5. A weight 24, fixed to the opposite end of each lever 21, serves to press the scrapers 22 with their cutting edges against the bottoms 5. In addition to the arms 17, with the scrapers 18, the radial arms 16 carry also scrapers 18[a], which scrape the inner surfaces of the mantle. The mantle 1 and 2 of the apparatus is provided with an opening 25 over each tray 4, around which, on the outside, a ring 26 is placed, coupled to the flange 27 of a neck 28. Through the wall of neck 28 passes the stem 29 of a scraper 30. Upon each tray 4 an inclined plane 31 has been provided, which rises to the inner surface of the ring 26. To this inclined plane joins a horizontal bottom piece 32, which faces the ring 26 and from which an inclined plane 33 descends to the plane of tray 4. 34 is a pipe standing in communication with the hollow space or jacket 3 of the mantle and serves to feed steam into this space. 35 is a pipe leading to the interior of the apparatus and serves to let the brine in. 36 is a pipe for letting off the vapor from the apparatus. On the shaft 11 are arranged funnel-shaped caps 37, which cover the center spaces 8 left open by the trays.

The working of the apparatus described is as follows: I admit the brine into the apparatus through the pipe 35, while steam is fed through the pipe 34 into the spaces 3 and 6. Through the heat of the steam the brine is heated and gradually evaporated, so that the salt is separated and deposited on the trays 4. At the same time in order that pan-scales cannot settle on the trays 4 and the inner mantle 2 I rotate the shaft 11 and scrape with the stirring devices 18, 22, and 18ᵃ the surfaces of the apparatus bathed by the brine. The deposited salt is carried off by the rotating scrapers 18 and raised on the inclined plane 31 to the horizontal surface 32, from which it passes through the openings 25 and the openings of the rings 26 into the pipe 28, through which it is discharged below. The slidable and pivotable scrapers 30 serve to keep the openings of the rings 26 and the neck 28 fastened to the same free from deposits of salt. The vapors formed by the evaporation of the brine are carried off above through the pipe 36. The pipe 36 can, where this appears desirable, be in communication with a vacuum.

In describing the working of the apparatus I have taken it that the whole is filled with brine. If I do not desire this, I can also work with any quantity of brine on each tray. To this end I adjust the cylinders 10 in a way that their upper edges are on the desired level. In this case the brine running over the upper edges of the cylinders is conducted to the lower trays through the funnel-shaped caps 37, so that also in this case the brine can be admitted through a single pipe 35. I can of course also convey the brine to each tray independently.

In the altered form of my apparatus shown in Figs. 5 and 6 I have also provided a cylindrical mantle 38 for the apparatus carrying a number of trays one over the other. These also have double bottoms 40 with hollow spaces 41 between. As the mantle 38 is only simple in this case, the spaces 41 are in communication with a steam-admission pipe through the socket 42. A central rotating shaft 44 is also here fitted with arms to which are affixed stirring devices. The stirring devices for the trays 39 consist, however, in this case of chains 46, while the lower sides of the bottom 40 are again brushed by scrapers 47, the same as with the apparatus shown in Figs. 1 to 4. For keeping the surfaces of the mantle clear brushes 48 have been provided. Pipe 49 and pipe 50 serve to let off the condensed water. A pipe 51 serves to admit the brine and the opening 52 in the upper part of the apparatus to let off the vapors. The mode of working of this apparatus is essentially the same as above described with reference to the Figs. 1 to 4 of the drawings. The separating salt falls, however, in this case through the central openings left free by the trays 39 upon the bottom of the apparatus and is conveyed from here through the openings 53 into a filter 54, where it is freed of the brine adhering to it. The brine collects in the lower part of the filter 54 and is on air being admitted through pipe 55 pressed out through pipe 56. From here the brine can be conveyed back into the apparatus or elsewhere.

What I claim as my invention, and desire to secure by Letters Patent of the United States, is—

1. In an apparatus for the evaporation of brine, the combination with a cylindrical mantle with openings for carrying off the salt and vapors and for the admission of brine, a number of superposed annular trays fastened to the mantle, double bottoms for the annular trays, with hollow spaces between, connections between the hollow spaces, means for connecting the spaces between the trays with a steam-conduit and for letting off the water formed in these spaces in the condensation process, of a rotating shaft passing through the central openings of the trays, said shaft being provided with stirring devices adapted to brush all surfaces covered by the brine, substantially as set forth.

2. In an apparatus for the evaporation of brine, the combination with a cylindrical mantle with openings for carrying off the salt and vapors and for the admission of brine, a number of superposed annular trays fastened to the mantle, double bottoms for the annular trays, with hollow spaces between, connections between the hollow spaces, means for connecting the spaces between the trays with a steam-conduit and for letting off the water formed in these spaces in the condensation process, of a rotating shaft passing through the central openings of the trays, stirring devices connected to said shaft, with cutting edges and placed obliquely against the faces of the apparatus, substantially as described and for the purpose specified.

3. In an apparatus for the evaporation of brine, the combination with a cylindrical mantle, a number of superposed annular trays fastened to the mantle, double bottoms for the annular trays, with hollow spaces between, connections between the hollow spaces, means for connecting the spaces between the trays with a steam-conduit and for letting off the water formed in these spaces in the condensation process, an opening in the mantle over the upper tray for the admission of brine, means for distributing the brine over the different trays, further openings in the mantle for carrying off the salt deposited and the vapors, of a rotating shaft passing through the central openings of the trays, said shaft being provided with stirring devices adapted to brush all surfaces covered by the brine, substantially as set forth.

4. In an apparatus for the evaporation of brine, the combination with a cylindrical mantle, a number of superposed annular trays fastened to the mantle, double bottoms for the annular trays, with hollow spaces between, connections between the hollow spaces, means for connecting the spaces between the trays with a steam-conduit and for letting off the water formed in these spaces in the condensation process, an opening in the mantle over each tray, an inclined plane on each tray leading from the surface of the dish to the said opening in the mantle, further openings in the mantle for the admission of brine and the carrying off of vapors, of a rotating shaft passing through the central openings of the trays, said shaft being provided with stirring devices adapted to brush all surfaces covered by the brine, substantially as set forth.

5. In an apparatus for the evaporation of brine, the combination with a cylindrical mantle with openings for carrying off the salt and vapors, with means for the formation of a vacuum, further openings in the mantle for the carrying off of salt and the admission of brine, annular trays, with hollow spaces between, connections between the hollow spaces, means for connecting the spaces between the trays with a steam-conduit and for letting off the water formed in these spaces in the condensation process, of a rotating shaft passing through the central openings of the trays, said shaft being provided with stirring devices adapted to brush all surfaces covered by the brine, substantially as and for the purpose set forth.

In testimony whereof I have signed this specification in the presence of two subscribing witnesses.

OTTO SACHSE.

Witnesses:
 WOLDEMAR HAUPT,
 HENRY HASPER.